United States Patent [19]
Jacottet

[11] 4,014,555
[45] Mar. 29, 1977

[54] HYDROSTATIC SEALING DEVICE

[76] Inventor: Jean Louis Jacottet, 7/7 Bis, Rue Jean-Mermoz, 78 003 Versailles, France

[22] Filed: Feb. 3, 1976

[21] Appl. No.: 654,769

[52] U.S. Cl. ............................. 277/3; 277/27
[51] Int. Cl.² ............................. F16J 15/40
[58] Field of Search .................. 277/3, 15, 27, 59

[56] References Cited
UNITED STATES PATENTS

| | | | |
|---|---|---|---|
| 3,021,146 | 2/1962 | Sommer et al. | 277/3 |
| 3,334,905 | 8/1967 | Horwitz et al. | 277/3 |

*Primary Examiner*—Robert I. Smith
*Attorney, Agent, or Firm*—Holman & Stern

[57] ABSTRACT

Disclosed is a hydrostatic sealing device for utilization of a high pressure fluid in providing a low friction seal for rotating or sliding parts. High pressure fluid is utilized to balance a piston-actuated seal against the rotating or sliding part with a low pressure section to remove leakage.

16 Claims, 4 Drawing Figures

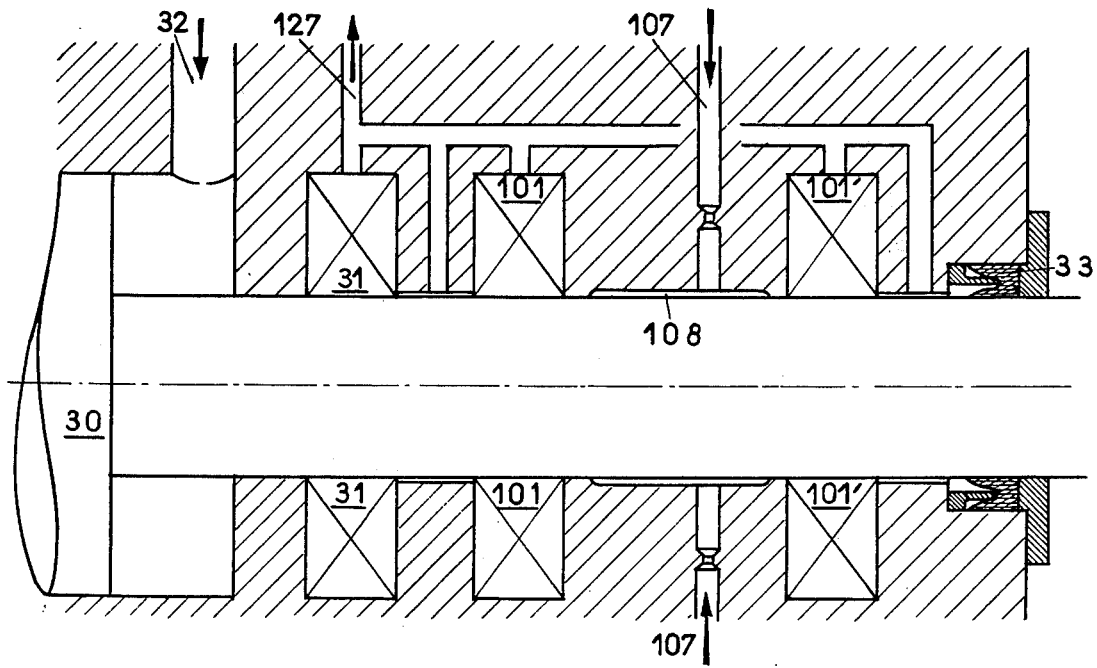

HYDROSTATIC SEALING DEVICE

BACKGROUND OF THE INVENTION

SUMMARY

The present invention relates to the so-called "hydrostatic sealing" of two surfaces in contact with one another, this term designating the case in which one of the two surfaces is subjected to th external pressure developed by a lubricating fluid tending to create a lubricating film between the two surfaces.

This problem has hitherto only been properly resolved by an acceptance of the fact that said theoretical film turns into a permanent oil leak and, since the oil is supplied under high or even very high pressure, by accepting the relatively large power losses is due to the need to permanently supply high pressure oil.

However, this form of seal is essential in all situations for applications which involve high frequencies of movements between the surfaces. Current research has encountered difficulty in reaching more than about 100 Hz except, as mentioned earlier, by accepting a considerable power loss.

The present invention is a hydrostatic sealing device utilising a high pressure acting through surfaces in mutual contact and executing relative motions, which surfaces comprise at least one segment split into a certain number of elements bearing against one another. When the contacting surfaces are cylindrical, the flat surfaces are contained in axial planes, and when the contacting surfaces are flat, they are in mutually parallel planes. The elements are individually hydrostatically balanced both in relation to the direction of relative motion of the contacting surfaces and in the direction perpendicular thereto is this prior art or applicant's invention.

One object of the present invention is to make it possible to achieve frequencies of at least 300 Hz by using hydrostatic segments of very low internal friction; in fact, efficiencies of better than 99.5% have been achieved. The invention is therefore applicable in particular to test applications such as vibration or fatigue testing for example. It is equally applicable to contact between flat surfaces or cylindrical surfaces. In accordance with the invention, in the direction perpendicular to the direction of motion, that face of the element which is opposite to the contacting surface is subjected to the action of a piston whose area of contact with said opposite surface is isolated from the high pressure by a seal. Because of this inventive idea, the sealing power is considerably increased and the oil losses are rendered acceptable at frequencies in the order hereinbefore indicated.

Other inventive features will become apparent from the ensuing description of two embodiments given by way of example, although the applicant does not intend to limit the general scope of this invention to the details or specific features of the examples chosen for illustration.

BRIEF DESCRIPTION OF THE DRAWINGS

Embodiments of the present invention will now be described by way of example, with reference to the accompanying drawings, in which:

FIG. 3 is an axial section on the line C,C of FIG. 1;

FIG. 4 illustrates a partial axial section of a jack in which the sealing of the piston rod must be effective on the one hand at the high pressure and on the other at the operating pressure of the jack.

DETAILED DESCRIPTION OF A PREFERRED EMBODIMENT

Figure 1:
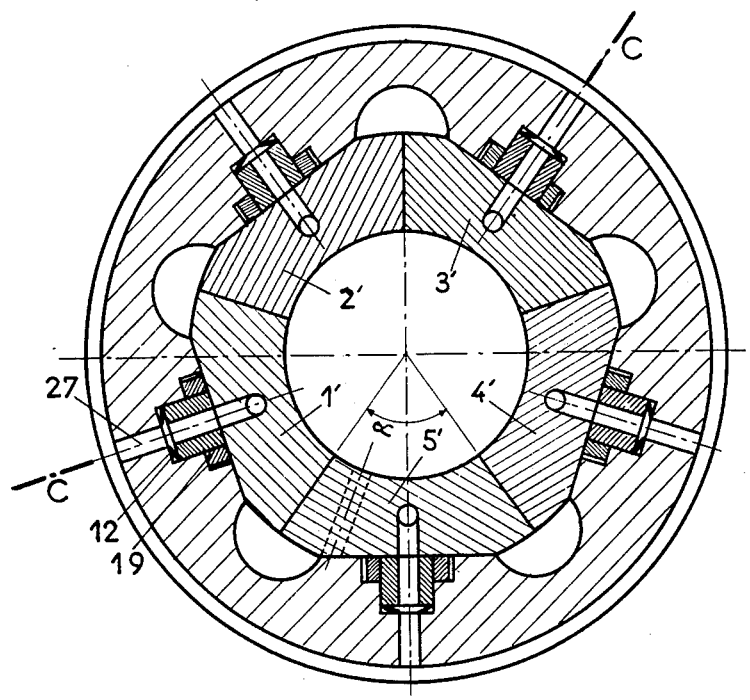
FIG. 1 is a section view perpendicular to the axis of the shaft rotating about its own axis and which it is intended to seal, the section being taken on the line A,A of FIG. 3.

In the attached drawings the reference numerals 1' to 5' have been assigned to the five elements which go together to constitute a segment in accordance with the present invention Sealing is effected at either side of an area of action of the high pressure, by two identical elements, the second of which has the same numbering but carries an apostrophe. If we consider the element 1 (the others being identical) the external high pressure which is to produce the hydrostatic seal, is supplied at 6 and acts upon the surface of the shaft between the two segments 1 and 1', via the line 7, the area of action on the shaft being designated 8. This area is also referred to in the art as a "balance chamber". Sealing is effected by the action of the piston 10 upon which there acts a ring 12 made of a spring steel. The spring biases the segmental element whether or not the device is supplied with the high pressure. In accordance with the invention, the high pressure of the oil escaping from the area 8, and acting on the area 13 of the segmental element 1, must be balanced by the action of the high pressure also applied to the opposite face 14 of the segmental element. This is ensured by virtue of a passage 15 (shown in broken line because it is not in the plane of the figure) which provides equal pressures on the two opposite faces of the segmental element. More particularly, the action of the high pressure on the area 8 and, multiplied by the balance coefficient, between the points 16 and 17 of the face 13, must balance that part of the face 14 which is located outside the seal 19 surrounding the piston 10 and preventing the high pressure from acting upon that face of the piston 10 bearing against the segmental element 1.

This condition makes it possible to calculate the distance between the points 16 and 17 as a function of the abutment area chosen for the piston 10, a matter which will present no problem for those skilled in the art of hydrostatic balancing and in particular of sealing devices of the kind with which the present invention is concerned.

In order to effect balancing in the axial direction, the high pressure of the oil escaping from the area 8 and reaching the area 20, as well as the surface 21, multiplied by the balance coefficient, must balance, at the opposite face of the segmental element, the action of said high pressure on the surface externally surrounding the annular seal 22.

The method of separating the high and low pressures by the use of annular seals such as those 19 and 22, is a supplementary inventive idea for the implementation of the invention. The reference 27 has been used to designate the passage through which residual or accidental leakage is discharged.

Figure 2:
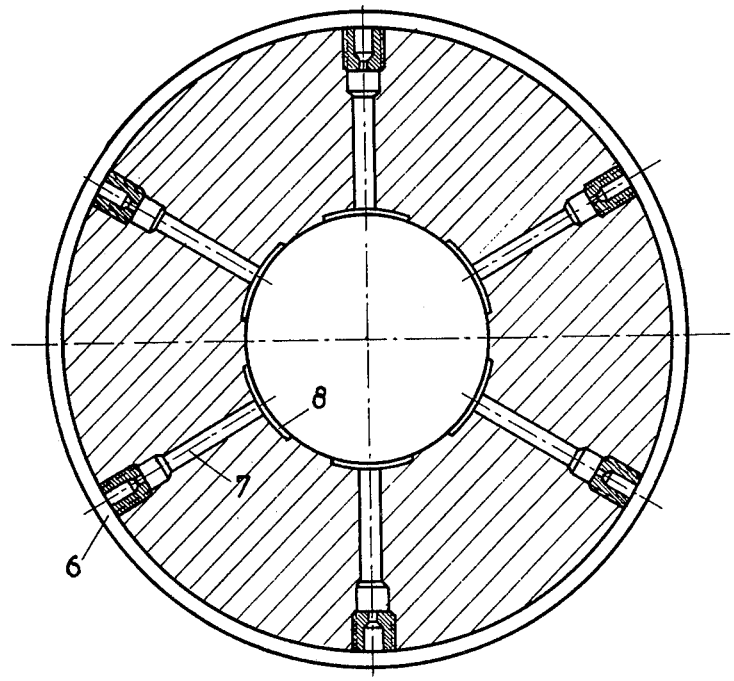
FIG. 2 is another section view perpendicular to the axis of the shaft, on the line B,B.

In the second example, shown in FIG. 4, the application of the invention not this time to a shaft rotating about its own axis but to a rod displacing in the direction of its own axis, for example the piston rod of a jack, has been illustrated. To simplify matters, rectangles worked with diagonals have been used to indicate the segmental elements shown in detail in FIGS. 1 to 3. Corresponding references, increased by 100, for elements or portions which also appear in the first three figures, have been retained.

The body of the jack has been shown in cross-hatched fashion. The rod unmarked is attached to the piston 30 which has not been separately illustrated. The high pressure is applied via 107 to the area 108, with the segments 101 and 101' at either side. Residual leakage is discharged through the passage 127. The object of the segment 31 is to effect a seal between the high pressure and the operating pressure of the jack, the latter pressure being applied through the passage 32.

At the output side, for reasons for economy a known kind of seal 33 has been provided since this only has to effect a seal against residual leakage, where the pressure is very low. If required, the seal 33 could be discarded, a small suction pump (not shown) connected to the passage 127, and this used to draw off residual leakage and air which would enter in the absence of the seal 33. It should be pointed out that in accordance with the invention the high pressure is sealed exclusively by hydrostatic seals between the contacting parts which are in relative motion.

What I claim is:

1. In a hydrostatic sealing device which effects a seal by means of a high pressure acting upon surfaces which are in mutual contact and perform relative motions, said device comprising at least one segment split into a certain number of elements having lateral faces, said elements bearing against one another through flat surfaces contained in axial planes, when the contacting surfaces are cylindrical, and contained in mutually parallel planes when the contacting surfaces are flat, said elements being individually hydrostatically balanced, both in relation to the direction of relative motion between the surfaces which are in contact with each other, and in relation to the direction perpendicular thereto, an improvement characterized in that in the direction perpendicular to the direction of motion, that face of the element which is opposite to the surface that is in contact, is subjected to the action of a piston in communication with said high pressure whose area of contact with said opposite surface is isolated from the high pressure by a seal.

2. A device as claimed in claim 1, wherein said device further includes spring means for providing a mechanical pressure so that the segmental element remains pressed against the contacting surface in the absence of any high pressure.

3. A device as claimed in claim 1, characterised in that in the axial direction, one of the lateral faces of the segmental element upon which said high pressure act is balanced by the pressure which acts upon the opposite face, with the exception of a central portion of said face which is sealed in relation to the high pressure by a seal surrounding said central portion.

4. A device as claimed in claim 3, wherein said improvement further includes a passage for discharging residual leakage opens to the interior of said central portion.

5. A device as claimed in claim 4, wherein said passage is radial in direction.

6. A device as claimed in claim 1, characterised in that at least one pair of two identical segments is used, the corresponding elements of which act at either side of one and the same area of action.

7. A device as claimed in claim 6, characterised in that between the two contacting surfaces of the two elements of the pair, a passage for the discharge of residual leakage is provided.

8. A device as claimed in claim 6, wherein said high pressure is a high pressure oil supplied to said area of action.

9. A device as claimed in claim 1, in combination with a jack, for sealing the high pressure in each direction of motion.

10. A device as claimed in claim 9, wherein said sealing is improved by the use of a supplementary segment.

11. A device as claimed in claim 9, wherein said jack includes a rod movably exiting from said jack, a further supplementary segment being used to seal the point of exit of the rod from the body of the jack.

12. A device as claimed in claim 9, wherein said jack includes a rod movably exiting from said jack, a seal is utilized to reduce leakage, and a suction line draws off any residual leakage.

13. A hydrostatic sealing device of the type adapted to feed high pressure sealing fluid between surfaces in sliding or rotating sealing engagement, said device including:
a source of high pressure;
a shaft;
at least one non-rotatable sealing ring, disposed around said shaft, said ring split into at least two floating elements bearing against one another through radially-extending sealing faces, each element having two opposite radially-extending faces hydrostatically balanced in an axial direction and having a cylindrical sealing surface and an opposite axially-extending surface hydrostatically balanced in a radial direction by said source of high pressure.

14. A sealing device as set forth in claim 13, including passage means delivering the high pressure fluid to said cylindrical sealing surfaces of each element, and intercommunicating between said cylindrical surface and the opposite axially-extending surface of said element.

15. A sealing device as set forth in claim 14, wherein said device further includes seal means for isolating a portion of said opposite axially-extending surface from said high pressure.

16. A sealing device as set forth in claim 15, wherein said seal means includes means for equalizing the effects of the high pressure on said cylindrical surface and said opposite axially-extending surface.

* * * * *